Feb. 28, 1956     G. M. WALTON     2,736,464
SODA FOUNTAIN
Filed April 25, 1952
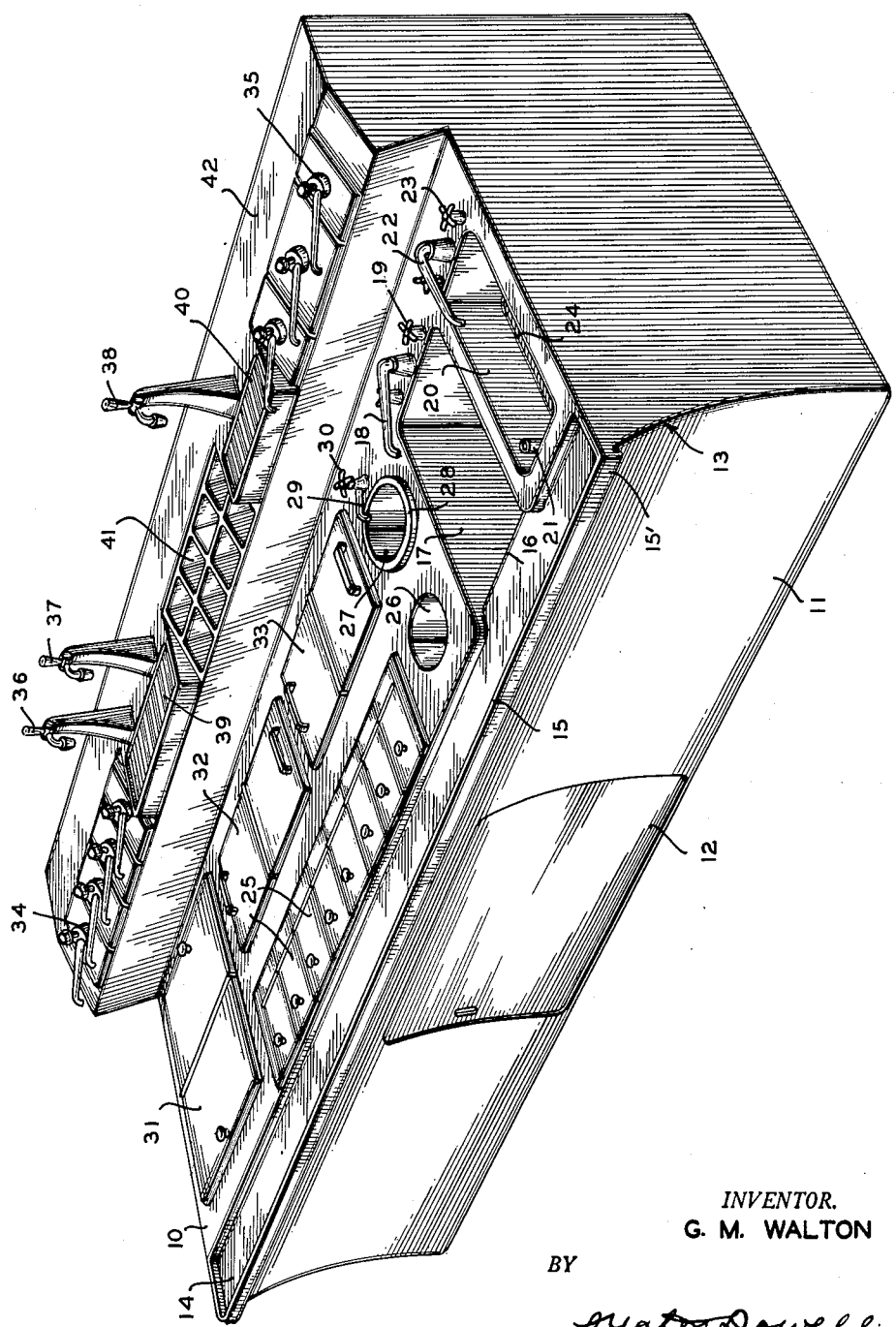
INVENTOR.
G. M. WALTON
BY
*A. Yates Dowell*
ATTORNEY United States Patent Office 2,736,464
Patented Feb. 28, 1956

2,736,464

SODA FOUNTAIN

George M. Walton, Thomson, Ga., assignor to Darrell M. Johnson, Thomson, Ga.

Application April 25, 1952, Serial No. 284,401

6 Claims. (Cl. 222—129.1)

This invention relates to the serving or dispensing of foods and beverages and more particularly to a soda fountain of the type used in supplying customers with milk and ice cream products, sundaes, sandwiches, and other things ordinarily sold from soda fountains.

In establishing a business where milk shakes, ice cream and kindred products are to be sold in soft or hard form with auxiliary foods such as crushed fruits, nuts, flavored syrups, and kindred substances, it is desirable for most efficient use to have a compact unit at modest cost. Soda fountain units which would fulfill these requirements have not been available and those which have been available have been unsatisfactory for various reasons, including their cost, size, and for other reasons.

It is an object of the invention to provide a simple, inexpensive, compact soda fountain suitable for the preparation and dispensing of milk and ice cream, drinks, sundaes, carbonated beverages, sandwiches and other foods ordinarily dispensed from a soda fountain in which there are receptacles for the various milk items with dispensing pumps, faucets with plain, carbonated, and ice water, a work area or table, washing facilities with hot and cold water, and the like.

Another object of the invention is to provide a soda fountain unit which is relatively short, has a work table along its rear surface with the other elements of the unit compactly and conveniently arranged so that they are easily accessible to an operator behind the same and with the work table or work section provided with a raised portion around its margin and a sluiceway which permits the raking or sweeping of food and the flow of liquid directly into a sink or wash basin, thereby providing a drainable type of construction so that the work table can be cleared of food and liquid by movement of a cloth along its area and into the sink.

A further object of the invention is to provide an auxiliary sink or wash receptacle which is relatively shallow for accommodating equipment used about the fountain, including containers in which milk shakes are made, and with means for appropriately refrigerating the various compartments in which foods are kept at freezing, subfreezing and above-freezing temperatures, as well as to provide a refuse opening and an ice cream dipper-well.

Further objects and advantages of the invention will be apparent from the following description taken in conjunction with the accompanying drawing, wherein the figure is a perspective illustrating one application of the invention.

Briefly stated, the invention is a soda fountain unit comprising a cabinet behind which a single operator can conveniently reach all parts of the same while standing substantially in one position. The cabinet has a work top or table along its rear edge nearest the operator, said table having a raised rim around the same except for a relatively short sluiceway section, which permits liquid to flow by gravity, and food to be moved, into an all purpose sink adjacent one end of the fountain. This sink is supplied with hot and cold water and beside the same is a narrower, shallower sink of generally similar character for the washing of containers, in which milk shakes are mixed, as well as other appropriate items.

Along the intermediate portion of the unit adjacent the work section are disposed a series of jars for items such as crushed fruit and the like, and at the left of which is a low temperature chamber and to the right of the same and in front of the jars for crushed fruit and the like are located, from left to right, a series of chambers two of which may be used for ice cream, a third for cracked ice, and a fourth for milk.

Along the forward edge of the top of the counter is disposed a serving counter immediately adjacent to which, along the length of the unit, are disposed from left to right a series of syrup pumps, a faucet for carbonated water and one for plain water, a series of receptacles for spoons and the like, an ice water faucet and a series of additional pumps.

To the left of the larger sink adjacent the work section is an opening through which waste material may be discharged into a refuse can supported beneath the same. If desired the refuse can may be disposed within the opening and with a flange about its upper end supporting the same.

In front of the refuse opening is a container for ice cream dippers or the like and to which water may be supplied by such a faucet.

The invention also includes a rear wall which curves rearwardly adjacent its upper edge to provide an overhanging ledge. The upper surface provides a work space or table and an operator can stand against the rear edge of the same.

Referring to the drawing, a cabinet is provided which has an upper surface 10 and a rear wall 11 with a door 12 affording access to the interior of the cabinet. The rear wall 11 is rearwardly curved along its upper portion forming an overhanging ledge 13, the upper surface of which provides a work table 14 along the rear upper area of the cabinet. This ledge permits the operator to stand substantially in contact with the rear edge of the cabinet while working.

The work table has a raised rim 15 around the same and is also provided with a depending lip 15' beneath the same for directing excess liquid away from the curved rear wall of the cabinet. The invention also includes a sluiceway along an extension 16 which empties into a relatively deep sink 17 supplied by a faucet 18 with hot and cold water controlled by hand valves 19. This sluiceway permits bread and other solids as well as liquids to be removed from the work table with minimum effort.

To the right of the sink 17 is a second sink 20 having a level control overflow pipe 21. This sink may be supplied with water from a faucet 22 controlled by handles 23. The faucets 18 and 22 are of the swivel type, permitting them to swing from side to side. If desired, instead of two faucets a single faucet may be employed for accomplishing the same result.

The sink 20 is approximately one-half the depth of the sink 17 and is provided with grid 24 for supporting articles which have been washed so that air may circulate about the same and they may drain and dry cleanly and quickly. This is particularly desirable of containers in which are mixed milk shakes and drinks of a similar nature.

The cabinet is provided with the necessary accessories in order that an operator may have at hand the desired supplies while standing substantially at the center of the rear of the cabinet and be able to prepare quickly and efficiently milk drinks, ice cream products including sodas and sundaes, carbonated beverages, sandwiches and other foods and drinks commonly available at a soda fountain.

The arrangement of the several elements on the cabinet is such as to obtain maximum accessibility and convenience. Accordingly a series of crushed fruit jars 25 are disposed forwardly of the work table along the intermediate portion of the same. Between the right-hand end of the row of jars 25 and the adjacent sink 17 is a refuse opening 26 beneath which a receptacle not shown may be employed for receiving the refuse or, if desired, a receptacle not shown having a rim around its open end may be supported within the opening.

Behind the refuse opening 26 is a container 27 having a rim 28 forming a shoulder so that the receptacle may be properly supported. If desired the receptacle 27 may be used for ice cream dippers or the like and running water may be made available by means of a pivoted faucet 29 controlled by a hand valve 30.

At the opposite end of the row of crushed fruit jars or receptacles 25 is located a low temperature compartment 31 in which ice cream and other frozen food is adapted to be kept.

Behind the crushed fruit jars or containers 25 between the low temperature chamber 31 and the receptacle 27 for the ice cream dippers are a series of additional compartments 32 and 33, the chamber 32 being preferably maintained at a temperature below freezing and the chamber 33 being maintained preferably at a temperature at or slightly above freezing and being particularly appropriate for crushed ice and milk and other food storage which is not desired to be frozen.

Between the line of compartments 31, 32 and 33 and the raised front area or servicing counter of the cabinet are disposed a series of syrup pumps 34 at the left and 35 at the right end of the cabinet between which are disposed dispensing faucets 36, 37 and 38. Beneath the faucets 36 and 37 is a drainage sump containing a grill 39 and beneath the faucet 38 is a drainage sump containing a grill 40. The faucets 36 and 37 may be employed by way of illustration for carbonated water and plain water and the faucet 38 may be used for ice water. Between the two groups of faucets are disposed a series of implement compartments for receiving cutlery, sipping straws and the like.

Along the front of the cabinet is a serving counter 42. This counter is at an elevation substantially above the elevation of the work table 14 and the tops of the syrup pumps 34 and 35 incline downwardly from the counter 42 toward the working area of the top of the cabinet. The provision of stepped surfaces such as the working table surface 14 and the counter surface 42 contributes to the usefulness of the device and the efficiency in the use of the same.

The structure thus produced not only lends itself to efficient use but it promotes sanitation in that it can be easily cleaned and maintained sanitary, the depositing of liquid and solid matter on the work table being prevented from soiling the rear wall on account of the raised rim 15 and being directed by the sluiceway into sink 17.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A soda fountain unit comprising a cabinet having a rear wall surface curving rearwardly adjacent its upper edge and providing an overhanging ledge defining a work table, spaced stepped upper surface areas defining a serving counter along the front of the cabinet and a work table at a lower elevation along the rear of the cabinet, dispensing pumps having inclined upper surfaces with forward edges adjacent the rear of the serving counter and rear edges at a lower elevation, multiple temperature compartments along the intermediate area of the cabinet, a series of receptacles along the rear portion of said unit adjacent the length of said work table, sinks adjacent the forward edge of said work table near one end of the same, said work table having a raised rim around the major portion of its margin providing a sluiceway from said work table into one of said sinks so that liquid and solid matter on said work table may be discharged into such sink.

2. A soda fountain having a work table at its rear, a serving counter at its front, a series of jars adjacent the mid-portion of the work section, a pair of sinks to the right of said jars and forwardly of said work section, a sluiceway from said table into one of said sinks, a refuse opening between the sinks and the end of said jars, an ice cream dipper receiving well forwardly of the refuse can, a series of multiple temperature receptacles forwardly of said jars, a freezing compartment at the left of said multiple temperature compartments and said jars, dispensing faucets, syrup pumps, implement compartments, and ice water dispensing equipment along the front portion of the cabinet adjacent said counter.

3. A soda fountain unit comprising a cabinet having spaced stepped upper surface areas defining a serving counter along the front of the cabinet and a work table at a lower elevation along the rear of the cabinet, dispensing pumps having inclined upper surfaces with forward edges adjacent the rear of the serving counter and rear edges at a lower elevation, multiple temperature compartments along the intermediate area of the cabinet, a series of receptacles along the rear portion of said unit adjacent the length of said work table, sinks adjacent the forward edge of said work table near one end of the same, said work table having a raised rim around the major portion of its margin providing a sluiceway from said work table into one of said sinks so that liquid and solid matter on said work table may be discharged into such sink.

4. A soda fountain comprising a cabinet of a height, length and breadth such that a single operator while standing substantially in one position behind the same can conveniently reach all parts thereof, said cabinet having a work table along the rear portion and substantially from end to end of its upper surface with a raised rim about the same and with a depending moisture deflecting lip along its forward edge and with a portion of the rim removed adjacent said lip providing a sluiceway for the discharge of material from said work table, said cabinet having a curved rear wall with an access opening therein and with its lower edge inwardly offset relative to its upper edge providing foot space so that the operator may stand close to the rear edge of the work table and a slide closure for the opening in said curved rear wall, said cabinet having a series of compartments distributed over the upper portion of the same some of which are arranged in compact alignment in juxtaposition to said work table for convenient use by the operator.

5. A counter-type soda fountain having compartments of a height, length and breadth such that a single operator can conveniently reach all parts thereof while standing centrally behind the same, said fountain being provided with compartments compactly arranged over substantially its surface, a work table along substantially the length of the upper surface of the fountain and provided with a retaining rim around its margin except for a short length omitted to provide a sluiceway for the discharge of material from said work table, said fountain having a rear wall with its lower portion forwardly disposed relative to its upper portion to provide foot space so that an operator can stand close to the fountain.

6. A soda fountain comprising a cabinet of a height, length and depth such that an operator standing in the rear thereof may be able to conveniently reach the front over a substantial portion along the length thereof, said cabinet having a work table along the rear portion extending over a substantial length thereof and being provided with a raised rim along the entire perimeter thereof except for a sluiceway along a forward edge in which the rim is omitted, said cabinet having a series of compartments distributed over the upper portion thereof with the compartments being located between the forward rim of said work table and the front of the cabinet, some of said compartments being closely adjacent the work table, and a sink in said cabinet beneath said sluiceway whereby debris on said work table may be brushed directly into said sink thereby simplifying the cleaning of said work table.

References Cited in the file of this patent

UNITED STATES PATENTS

| Number | Name | Date |
|---|---|---|
| 537,434 | Berner | Apr. 16, 1895 |
| 668,482 | Bernstein | Feb. 19, 1901 |
| 1,283,330 | Sebring | Oct. 29, 1918 |
| 1,394,130 | Wiechert | Oct. 18, 1921 |
| 1,543,610 | Marsh | June 23, 1925 |
| 2,143,039 | Stoddard | Jan. 10, 1939 |
| 2,182,032 | Muller | Dec. 5, 1939 |
| 2,465,142 | Wisler | Mar. 22, 1949 |
| 2,497,688 | Pohl | Feb. 14, 1950 |
| 2,539,464 | Norquist | Jan. 30, 1951 |
| 2,628,009 | Idzi | Feb. 10, 1953 |